Nov. 25, 1969  H. Z. MORGAN  3,480,178
CONTAINERS THAT ARE COMPACTLY NESTABLE WHEN EMPTY
AND STACKABLE IN SPACED RELATION WHEN FULL
Filed Sept. 16, 1968  5 Sheets-Sheet 1

*INVENTOR.*
HENRY Z. MORGAN
BY
Agent

FIG_5

FIG_6

FIG_7

FIG_8

FIG_10

FIG_9

INVENTOR.
HENRY Z. MORGAN

FIG_11

FIG_13

FIG_12

FIG_14

FIG_16

FIG_15

INVENTOR.
HENRY Z. MORGAN
BY
ATTORNEYS

FIG_18

FIG_17

FIG_20

FIG_19

FIG_21

FIG_22

INVENTOR.
HENRY Z. MORGAN
BY
ATTORNEYS

United States Patent Office 3,480,178
Patented Nov. 25, 1969

3,480,178
CONTAINERS THAT ARE COMPACTLY NESTABLE WHEN EMPTY AND STACKABLE IN SPACED RELATION WHEN FULL
Henry Z. Morgan, 153 Arquemedes-Polanco, Mexico City, Mexico
Continuation-in-part of application Ser. No. 674,415, Oct. 11, 1967. This application Sept. 16, 1968, Ser. No. 766,666
Int. Cl. B65d 21/06, 1/24, 1/38
U.S. Cl. 220—97  27 Claims

ABSTRACT OF THE DISCLOSURE

Containers molded from plastic in an open-work wall structure are compactly nestable when empty and are equipped with removable corner supports for stable stacking in spaced relation when filled.

---

This application is a continuation-in-part of application Ser. No. 674,415, filed Oct. 11, 1967, now abandoned.

This invention relates to a novel type of container especially useful for shipping fresh fruit to the market.

Fruit such as strawberries, blackberries, raspberries, blueberries, cherries, figs, peaches, tomatoes and many others are frequently sold in baskets, many of them in a standard one-pint basket. Recently, these baskets have been made from plastic formed with net-like perforate walls so as to give adequate access by air. The present invention relates to a larger container capable of carrying a plurality (e.g. a dozen) of the smaller baskets, thereby enabling the packing of the baskets without damage to the fruit and enabling the transport of the fruit with good aeration and without unwanted contact of the small baskets with each other.

Heretofore, even after the complete acceptance of small perforated berry baskets, the shipping cartons were made from corrugated board. There were some perforations but not enough because a really adequate amount of air circulation could be provided only by unduly weakening the carton. The present invention provides perforate shipping containers wherein the walls are more open than closed, thereby giving the fresh fruit a longer shelf life, reducing mold spoilage, and affording visibility from all sides.

The use in this invention of perforated molded plastic containers enables cleaning the containers and fruit, by dipping, reduces the shipping weight, and makes it possible to get approximately 25% more fruit into a truck or shipping car than when cardboard cartons are used.

A novel feature enables the new cartons to be stackable with the fruit in them without damage to the fruit, and provides for improved aeration and spacing and protection. Stackability is combined with stabilizing of the stacks and with proper spacing for aeration.

It is important that the empty containers be stackable much more compactly than when they are filled with fruit to enable compact shipping and storage of the empty containers, and this invention provides for the empty baskets to be stacked compactly or nested and enables them to be converted from compact stacking to separated stacking and vice versa in a very simple and convenient manner.

An important problem which the invention solves is how to reconcile the adequate aeration of the fruit with adequate strength and protection of the containers from breakage. There are many places at which such a container would tend to be strained, both when shipped empty in compact stacking and when shipped full of fruit in spaced-apart-stacking, and the present invention provides structure that gives support where the support is needed, without losing the aeration of an open-work structure or requiring large amounts of extra material overall.

The invention comprises a tray-like plastic compartmented container able to contain a plurality of small baskets on an open-network type of base and having open-network side walls and divider walls. At upper corners, novel removable brackets or supports may be put on or taken off. When put in place, as when the fruit in baskets is in the containers, the containers can be stacked in spaced relation so as to protect the contained fruit.

The container of the present invention has a bottom and generally peripheral upstanding, outwardly sloping walls. The interior of the container is diveded by generally upstanding sloping dividers which are substantially shorter than the peripheral walls, arranged in a triangular structure to provide structure strength. A support member is removably affixed to each of the upper junctures or corners of the peripheral walls, and the supports, when in place, prevent the containers from nesting when stacked together. All walls of the container are well perforated for free flow of air therethrough.

In essence, the present invention provides a novel container with divided interior compartments, that can be easily nested for compact shipping and, when loaded, can be easily stacked in spaced relation by installing the removably affixed corner supports. The corner supports and the triangular structure of the interior dividers makes possible an extremely lightweight and economical container which is rigid and strong.

Many other features of the invention and other objects and advantages will appear from a detailed description of some preferred embodiments, as follows.

The container may be formed by a well-known plastic forming method, such as, for example, injection molding or the like. Any of a great variety of materials may be used for the container; however, for lightness, and economy of manufacture, a high impact polystyrene plastic is preferred. Other well known plastics, such as the acrylics, may be utilized; for example, polymers of methyl methacrylate, methyl acetate, may be used.

Figures 1, 4:
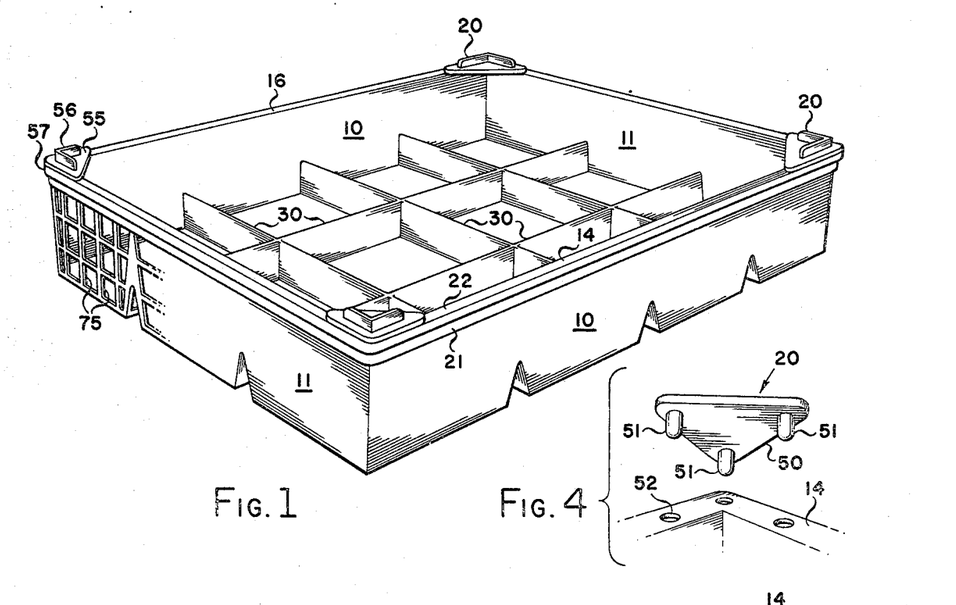
FIG. 1 is a view in perspective of one form of container embodying the principles of the present invention. The walls are all perforate, but for simplicity's sake the detailed structure is shown only in the upper left hand corner.
FIG. 4 is a view in perspective of one of the corner supporting members, removed from the container, and a corner of the container of FIG. 1.

The container shown in FIG. 1 is particularly adapted to carry fruit baskets, such as strawberry baskets, and will be described in relation to such fruit baskets, without being limited thereto.

Figures 2, 3:
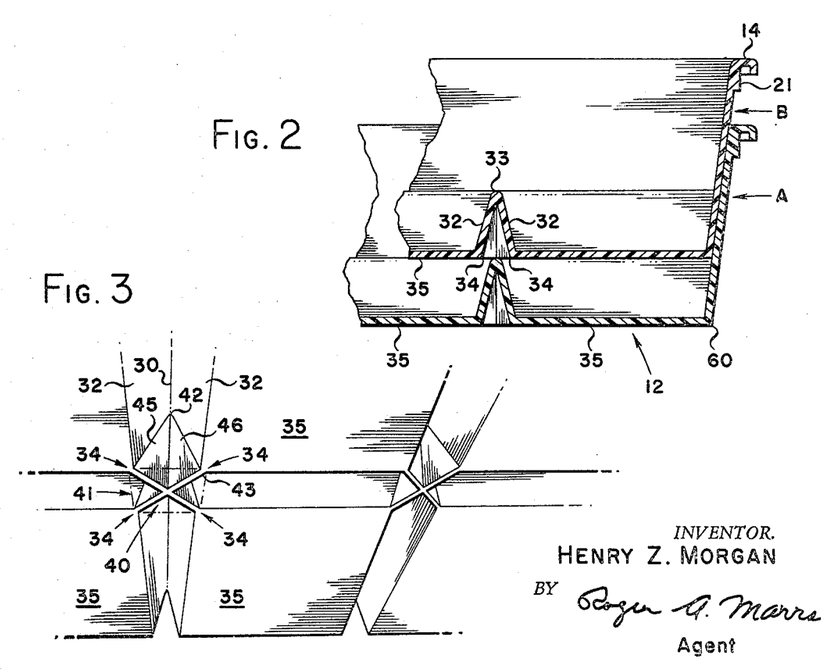
FIG. 2 is a fragmentary view in cross-section, showing two containers of the type of FIG. 1, nested one within the other.
FIG. 3 is a fragmentary view in perspective, looking up from below at the bottom of the container of FIG. 1.

The container of FIG. 1 has two side walls 10 and two end walls 11, all the walls being slightly inclined so that the end walls 11 are spaced apart slightly more at the top of the container than at the bottom 12 thereof and so are the side walls 10. This inclination of the walls, as shown in FIG. 2 enables two empty containers A and B to nest one within the other, although the containers A and B each have the same external configuration and dimensions. The side walls 10 and end walls 11 are formed integrally with each other and with the bottom 12.

At their top edges, the side walls 10 and end walls 11 are integrally formed with a facia rim or collar 14, preferably thickened to impart structural rigidity to the container and for providing an installation surface 16 for the corner support members 20, as will be described in more detail hereinafter. The facia rim 14 is formed in two general portions 21 and 22. The portion 21 provides a stiffening rim for structural rigidity and strength, while the portion 22 extends transversely outwardly, more than does the portion 21, and thus forms an external flange which provides the installation or mounting surface 16 for the corner supports 20, as well as providing additional structural strength for the container.

Interior dividers 30 separate the interior of the container of FIG. 1 into separate compartments; e.g. twelve interior compartments, for convenience in carrying twelve fruit baskets—a standard crate number. The dividers 30 are generally upstanding and are integrally formed with each other at their points of intersection and with the side walls 10 and end walls 11. The dividers 30 are substantially shorter than the side walls 10 and end walls 11, so that several containers can be nested, one within the other, when they are empty. The height of dividers 30 is not critical and need only be of sufficient magnitude to provide the necessary structural rigidity for the container and to provide a sufficient bearing surface to retain the fruit baskets or other articles which are to be the contents of the container. In a prototype of the preferred embodiment, desirable dimensions were found to be 1¼ inches for the height of the dividers 30 and 4 inches for the height of the walls 10 and 11, but these dimensions are not critical and other dimensions may be chosen depending on the desired use of the container. The dividers 30 are integrally formed to the walls 10 and 11, preferably at right angles thereto, and they intersect with each other at right angles, at least when square fruit baskets are to be held.

As shown in FIGS. 2 and 3, the dividers 30 form a triangular structure having triangular faces 32 which form in cross section an isosceles triangle with the base line of the container. The faces 32 are integrally formed together at their top 33 and are each integrally formed to the bottom surface 35 of the container at their bottoms 34. Where two of the dividers 30 intersect, the area of intersection has integrally formed therein a cross structure 40. At the area of intersection of two dividers 30, each of the dividers 30 so intersecting is formed such that if the other divider 30 continued through the intersection area without change, the formed divider would conform to the slope of face 32. Since, however, both of the intersecting dividers are formed in exactly the same manner, a pyramidal volume 41, with its apex at point 42 is formed. The base of the pyramidal volume 41 is square in the preferred embodiment of the invention, and has its base 43 defined by the dotted lines in FIG. 3 of the drawing. The pyramidal volume 41 is divided by two planes, each aligned through the diagonally opposed points of the base of volume 41 and the apex 42. Thus, in the intersection area of two dividers 30, a cross structure 40 is formed which comprises two triangular sections 45 and 46 integrally formed to each other and to the bottom 35 and to the intersecting dividers 30. This arrangement provides an extremely rigid and strong structure which retains its rigidity and strength although the parts are formed of lightweight plastic as mentioned hereinabove.

The faces 32, as well as providing strength and rigidity to the container, serve two additional purposes. They firstly conform to the sides of fruit baskets, which typically are slightly sloped outwardly towards the top. The faces 32, because of the separation at the bottom thereof, also keep the bottoms of fruit baskets well separated so that although the baskets slope outwardly towards the top thereof, the tops nevertheless do not contact each other. Thus, the baskets are carried firmly and yet no danger whatsoever is presented to the contents of the baskets that are carried within the container.

As can best be seen in FIG. 4 of the drawing, the corner support 20 may be in the shape of an equilateral triangle section 50 with three studs or projections 51 depending therefrom. The projections 51 are integrally formed with the triangle section 50 and are located proximate the three corners of the triangular section 50 for economy of space and material. The corner support 20 may be made of one of the same lightweight plastic materials that are used for the container. Holes 52 are formed in flange 22, also in an equilateral triangle orientation, to correspond exactly with the placement of the projections 51. The projections 51 are generally cylindrical with a taper and are dimensioned in diameter substantially equal to but slightly greater at the larger end, than the diameter of the holes 52 to provide for an interference fit. Thus, installation of projections 51 into holes 52 is easily accomplished manually, providing for an excellent connection. This arrangement is extremely effective and most economical in manufacture.

On the top surface 55 of the corner support 20 is provided a right angle generally vertical section 56 located inwardly from and in alignment with triangle section 50 of corner support 20. Placement of the right angle sections 56 is such that the sections 56 fit exactly the corners 60 of the bottom 35 of the container.

Of course, many other embodiments of the corner support may be utilized. For example, one modification could provide a flexible strip or coupling between the corner support and the container to prevent the loss of the corner supports as well as making them immediately available for use.

As shown in FIG. 1, rectangular perforations 75 may be provided in the walls 11. These perforations are are also provided throughout the walls 10 and the dividers 30. The square perforation 75 gives substantial rigidity coupled with substantial open area. The open area provides for free flow of conditioning air throughout the container and the contents within.

A typical fruit basket, such as a strawberry basket, is also constructed of high impact plastic with air openings. The open work of the present invention provides extremly high degrees of transparency and free air flow to take advantage of the characteristics of fruit baskets. Thus, more of the containers of the present invention may be stacked when full because of the ease of air conditioning the containers. Also, a visual inspection of the container will reveal the quality of the contents therein. This advantage of free air flow through the containers permits the immediate refrigeration of the contents within the fruit baskets and precludes spoilage at the beginning of shipment to market of fruits and other foods.

Figure 5:
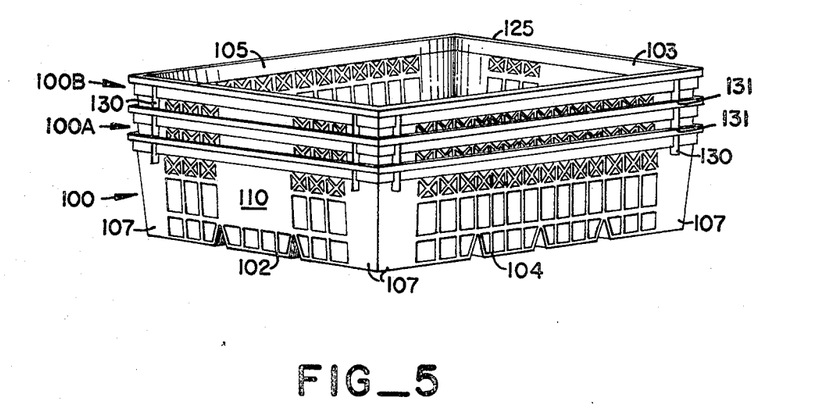
FIG. 5 is a view in perspective of a compact stack or nest of three containers of a modified form, also embodying the principles of the invention.
Figure 6:
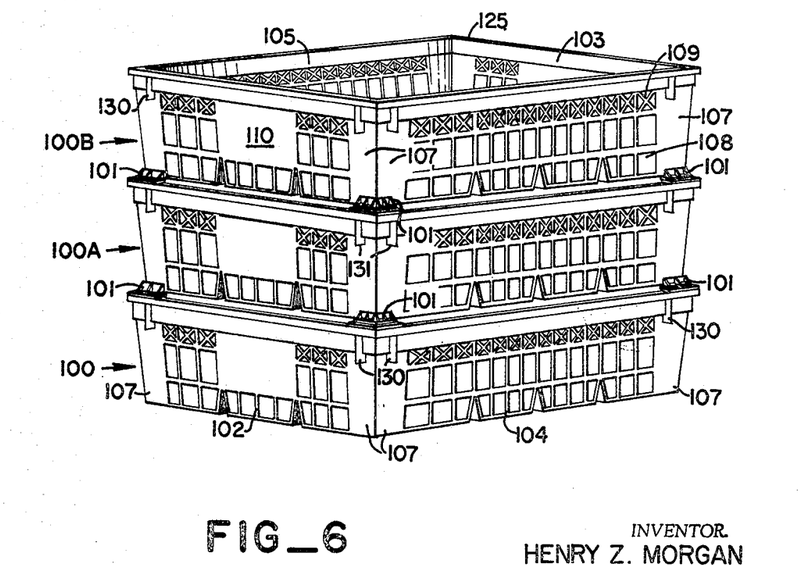
FIG. 6 is a view in perspective of the spaced stacking of the three containers of FIG. 5, such as is used when the containers are filled.

A modified form of the invention is shown in FIGS. 5 to 21. Thus, FIG. 5 shows three containers 100, 100A and 100B embodying the principles of the invention compactly stacked together in the manner in which much higher stacks are shipped when the containers are empty. In contrast, FIG. 6 shows the same containers 100, 100A and 100B to which support members 101 have been applied to enable spaced stacking so that each basket 100A and 100B rests on top of the top of the container 100 or 100A therebelow, and the contents of the lower containers are protected.

The containers 100, 100A and 100B are identical, and each of them is provided with perforate end walls 102 and 103 and perforate side walls 104 and 105, all of which slope outwardly from a bottom wall 106 (which is likewise perforate), to enable the compact stacking shown in FIG. 1. Each wall 102, 103, 104 and 105 may have solid end portions 107 to increase strength at the corners, and otherwise is mostly perforate, the perforated area being greater than the plastic area, in preferred forms. There may be two lower rows 108 of square or rectangular perforation and an upper row of diagonal ribbing 109 to add strength, and there may be solid upper end portions 110 for the same purpose.

Figure 7:
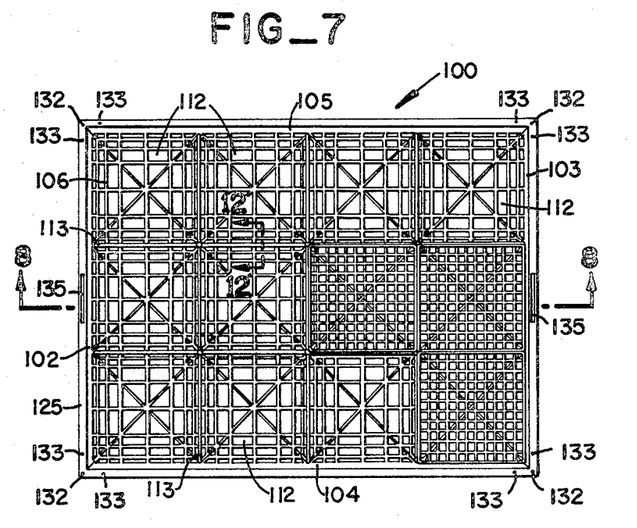
FIG. 7 is a top plan view of one of the containers of FIG. 5 as it appears before insertion of the corner pieces.
Figure 8:
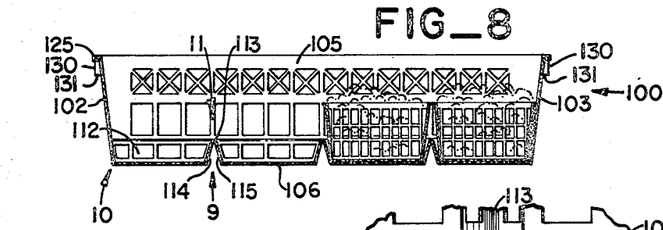
FIG. 8 is a view in section taken along the line 8—8 in FIG. 7.
Figure 9:
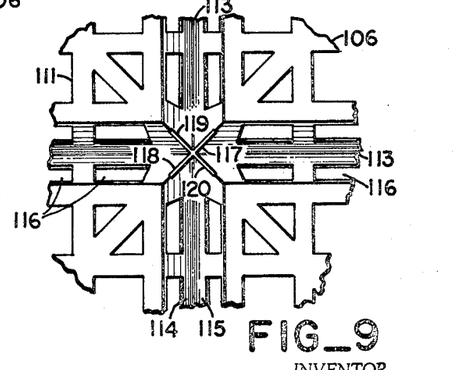
FIG. 9 is an enlarged fragmentary bottom view of a bottom portion of the container, looking in the direction of the arrow 9 in FIG. 8.
Figure 10:
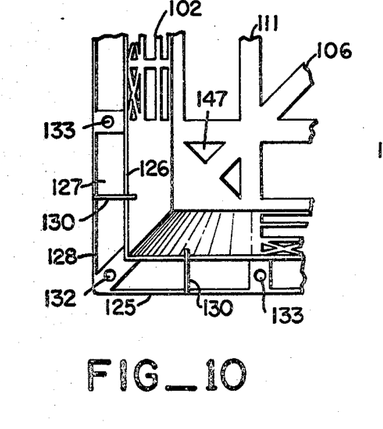
FIG. 10 is a fragmentary bottom view of a corner portion of the container looking in the direction of the arrow 10 in FIG. 8.
Figures 11, 12, 13, 14, 15, 16:
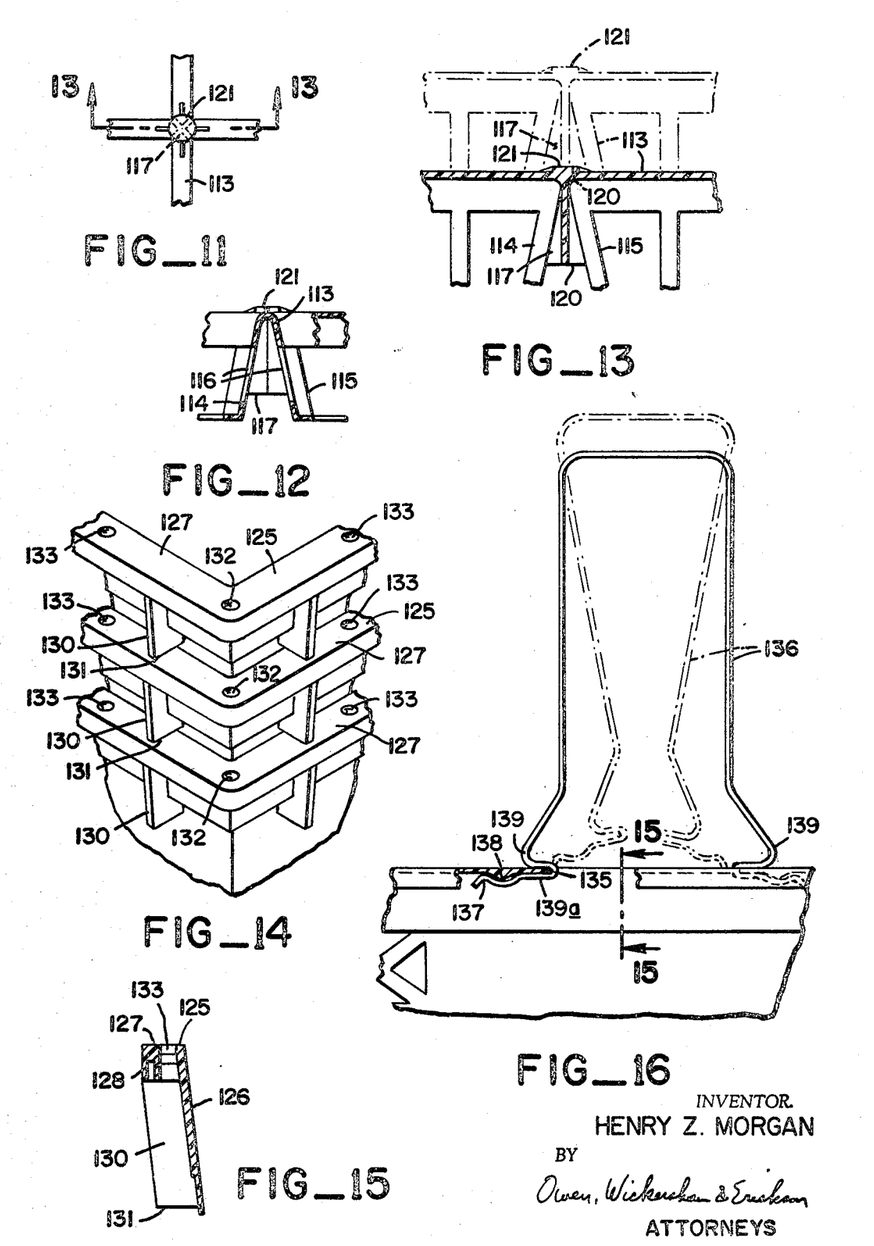
FIG. 11 is a fragmentary top view of a portion of the container looking in the direction of the arrow 11 in FIG. 8.
FIG. 12 is a fragmentary view in section taken along the line 12—12 in FIG. 7.
FIG. 13 is a fragmentary view in section of the container taken along the line 13—13 in FIG. 11, with an upper container stacked thereon shown in phantom.
FIG. 14 is a fragmentary view in perspective of one corner of three compactly stacked containers of FIG. 5.
FIG. 15 is a fragmentary view in section taken along the line 15—15 in FIG. 16.
FIG. 16 is a fragmentary enlarged view in side elevation and partly in section showing how a wire handle may be added to the container.
Figures 17, 18:
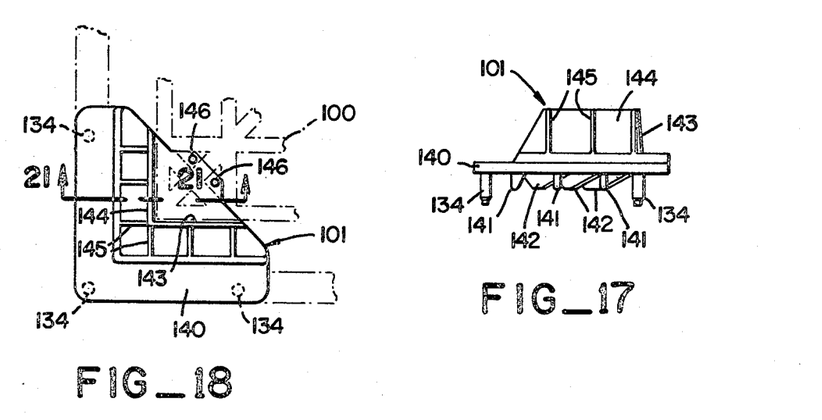
FIG. 17 is a view in side elevation of a preferred form of corner support bracket embodying the principles of the invention, and as used in FIG. 6.
FIG. 18 is a top plan view of the support member of FIG. 17, with the top corner of the lower container and the bottom corner of the top container shown in phantom.
Figure 19:
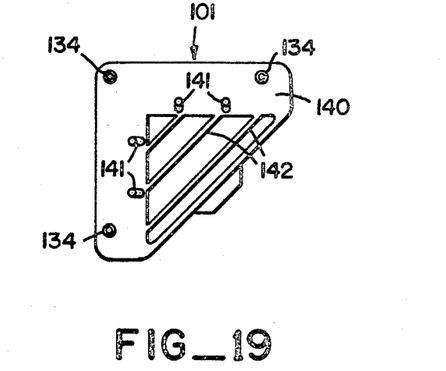
FIG. 19 is a bottom plan view of the support member of FIGS. 17 and 18.
Figure 20:
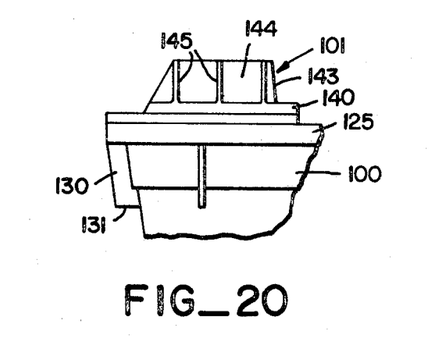
FIG. 20 is a fragmentary view in side elevation of the installed support member.

Preferably, the bottom wall 106, which is also perforate with both rectilinear and diagonal ribs 111, is subdivided into a plurality of compartments 112, each to receive a smaller basket such as a one-pint fruit basket for strawberries, blueberries, etc. These compartments 112 are preferably provided by lateral and longitudinal rows of V-shaped partitions 113 which extend up a short distance from the bottom wall 106, as shown in FIGS. 7 and 8, the partitions comprising two sloping portions 114 and 115, as shown in FIGS. 9, 12 and 13, both made up of vertical ribs between horizontal extremities, with large perforations 116 between ribs. The V shape helps to enable compact stacking, but to avoid overcompact stacking with resultant damage to the containers and also inconvenience in separating them from each other, a special reinforcement member 117 is provided at each intersection of the partitions 113, the member 117 comprising reinforcing ribs 118 and 119 (FIG. 9) extending diagonally across the corners from the top down, and end a little more than halfway down at an edge 120. Also, at the top of each intersection a round pad 121 (see FIGS. 11-13) is molded, rising above the partitions 113, so that when the containers 100, 100A, 100B are stacked, as shown in FIG. 5, the edge 120 of the reinforcing member 117 rests on the pad 121, and this supports the upper container without placing stress on the weaker remainder of the V-shaped channel portions 113.

Similar support is provided at the rim portions 125, which surround the upper ends of the walls 102, 103, 104, 105. The rim portion 125 (see FIG. 15) preferably comprises a thickened wall portion 126, a horizontal portion 127, and a depending portion 128, giving the rim a channel shape for greater strength. Near the corners, depending ribs 130 extend below the channel portions to about the same height as the reinforcing members 117, so that when the containers 100, 100A, 100B, etc. are compactly stacked, the lower edges 131 of the ribs 130 rest on the horizontal portions 127, and these eight engagements plus those of the members 117 with the pads 121 are preferably the only areas of contact between an upper container 100A and a lower container 100. Thus, strength is conserved.

The rim portions 125 have four openings 132, one in each corner, and, spaced therefrom, openings 133, to give three openings 132, 133 in each corner area to receive the three projections 134 of each corner member 101. The rims may also have a pair of rectangular slots 135, one above the center of each end wall 102, 103, for the reception (see FIG. 16) of wire handles 136 of spring wire, when desired, the handles 136 having locking portions 137 that engage latching portions 138 of the rim 125 and also shaped to engage both the upper and lower surfaces of the rim 125 near the slots 135 by portions 139 and 139a.

Each corner member 101 is identical to the others. It has a horizontal portion 140 from which the projections 134 depend, as well as auxiliary gripping projections 141, that engage the edge of the rim 125 and aid in stability of the corner member 101 in relation to the upper rim of the lower container. The lower surface of the corner member may also have strengthening ribs 142 to aid in supporting the trays which are stacked above it. Corner retention for the tray above is provided by two generally vertical walls 143 and 144 that preferably slope at the same angle as the walls 102, 103, 104, 105. These walls may be reinforced by ribs 145. A pair of projections 146 on the upper surface of the corner member 101 serve to engage opposite edges of a rib 111 of a superimposed container in the area of 147 on FIG. 10. These serve to add further stability to the corner.

Figure 21:
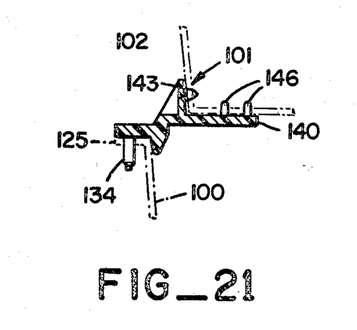
FIG. 21 is a view in section taken along the line 21—21 in FIG. 18.

In addition to the walls 143 and 144, I provide upwardly pointing projections 146, which are positioned to align with openings, such as 147 (FIG. 10), in each bottom corner of the container. As shown in FIG. 21 this gives an important hold by the corner member on the lower corner of each container, and thereby aids in locking each layer of containers to the ones below. In other words the walls 143, 144 hold each upper container against outward movement in relation to the corner member, and the projections 146 (being locked in openings 147 of the upper container) hold each upper container against lateral movement in either direction in relation to the corner member.

While in the drawings the projections 134 and 146 are shown as tapered cylindrical pins, with lower ends smaller than the openings 132 and 133 and shanks that taper to a size larger than the openings 132, 133, to provide the desired interference fit, it would be possible to have these projections and the slots into which they project, of a different male and female cross-sectional shape.

Figure 22:
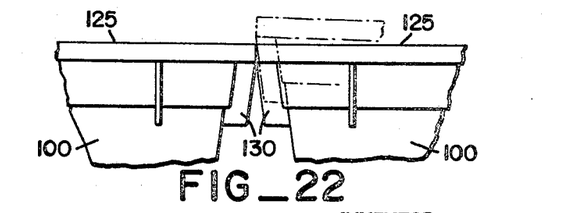
FIG. 22 is a fragmentary view of the edges of two containers placed adjacent to each other, as on the floor of a truck.

A word should be said about an advantage derived from the depending ribs 130 near the corners on the upper rim of each container. This advantage is one of the features that has contributed to the usefulness of the present invention. Because of the present container, it has been found practical to ship strawberries by truck from California to the Chicago market. Heretofore the cardboard containers occupied more space so the value of the berries that could be loaded did not justify the expense of the truck shipment. With the present containers, 25% more berries can be carried, thereby making truck shipment practical. An important feature contributing to this result is the open space around the four walls of each container, which permits efficient ventilation and refrigeration of the berries. No strip or separator is needed to keep the trays aligned vertically. The stacks of containers are set on the truck floor with the upper rims of each stack and layer of containers in contact with adjacent containers at the same level. As shown in FIG. 22 the depending ribs 130 perform the important function of preventing the rim of one container from crawling up on top of the rim of the adjacent container. All the time the truck is on the road and the load is being jiggled the ribs 130 are fending off the rim of the adjacent container, thereby preventing any distortion of the load at any level, all the way to the ceiling of the truck.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A container that stacks compactly with like containers when empty and that stacks with them when filled in a way protecting the contents, comprising:
   side walls, end walls, and a bottom formed integrally,
   a rim portion continuous with and integrally formed to said side walls and end walls at the top thereof,
   a plurality of corner supports,
   means for securing said corner supports to said rim portion, said corner supports being intsalled when the containers are filled, the containers being stackable compactly before their installation, and
   a plurality of divider walls, each extending between said side and end walls, and shorter than them, each divider being integrally formed to said bottom and to one of said side an end walls,
   each of said corner supports comprising adapter means for engaging with a bottom corner of the side walls, end walls and bottom of a like container set thereon, and for stabilizing that like container,
   each said adapter means having mating means on its under side for joining the same to the corner of the supporting container, comprising part of said means for securing.

2. The container of claim 1 wherein all of said side walls, end walls, bottom, and divider walls are perforate and are made in one piece from molded plastic with the area of the plastic substantially smaller than the perforate area.

3. The container of claim 1 wherein all of said side, end, and divider walls slope outwardly from their lower to their upper end at about the same angle, the slope being sufficient to enable compact stacking.

4. A container as defined in claim 3 wherein each said corner support comprises:
   a generally horizontal section adapted to contact said rim portion proximate a corner thereof and
   an upright angle section forming a corner and sloping outwardly as do the container walls, extending up from said horizontal section and adapted to fit a bottom corner formed by said end walls, said walls and said bottom, and wherein
   said means for securing comprises
   a plurality of tapered projections extending perpendicularly down from said horizontal section and a corresponding plurality of openings defined in a horizontal portion of said rim portion and having a size substantially equal to but less than the maximum size of said projections, whereby said projections may be interference-fitted into said openings.

5. The container of claim 4 wherein there are three said projections and three said openings, one opening at a corner of said rim and one on each side thereof spaced therefrom.

6. The container of claim 4 wherein there are additional downward projections on each said support member spaced from said already mentioned projections and serving to lie closley adjacent to an edge of said rim portion for stabilization of said support member relative to said rim portion.

7. The container of claim 4 wherein a set of second projection means extend up from said horizontal section within the upright portion and wherein the bottom of each container is perforate and has a rib adjacent each bottom corner that can engage between said second projection means on a supporting container to stabilize the position of the supported container.

8. The container of claim 4 wherein said angle section is reinforced by outer ribs and said horizontal section is reinforced by diagonal ribs on the lower surface thereof.

9. A container as defined in claim 3 wherein some of said divider walls extend across between said side walls and some extend across between said end walls to define rectangular partitions for holding smaller boxes therein, each said divider wall comprising two sloping faces joined at their upper ends and separated at the bottoms, each intersection of said divider walls defining corners of a pyramidal volume with its apex at the point where the upper ends of said divider walls intersect and wherein an integral reinforcement structure is provided in said volume, said structure comprising two intersecting diagonal planar members extending across the diagonally opposed corners of the divider walls.

10. The container of claim 9 wherein said intersecting diagonal planes extend from the top to the bottom of said divider walls.

11. The container of claim 9 wherein said intersecting diagonal planes extend from the top to a little past halfway to the bottom, to enable support when stacking.

12. The container of claim 11 wherein each intersection is provided with a pad projecting somewhat above the upper ends of said divider walls, said intersecting diagonal planes having a lower edge that rests on said pad and transmits therethrough all the weight that is transmitted to said dividing walls.

13. The container of claim 12 wherein adjacent each corner of said container said rim portion is provided with depending vertical ribs with lower edges that rest on the upper face of said rim portion when containers are compactly stacked, and of a length such that the force transmitted from an upper tray to a lower one in which it is stacked is carried entirely by said rim ribs to the lower said rim and by said intersecting diagonal planes to said pads.

14. The container of claim 3 having lifting handles comprising a pair of bent springy wires each fitting into receiving means in said rim portion at two axial extremities and having locking means cooperating with latching means on said rim to retain them there.

15. A container comprising:
   side walls, end walls, and a bottom integrally formed together,
   a facia rim continuous with and integrally formed to said side walls and end walls at the top thereof,
   a plurality of corner supports,
   means for securing said corner supports adjacent said facia rim, and
   a plurality of divider walls, each extending between said side and end walls, each divider being integrally formed to said bottom and to one of said side and end walls,
   each of said corner supports comprising an adapter to engage with the bottom corner of the side walls, end walls and bottom of a like container set thereon,
   each adapter having mating means on its under side for joining the same to the corner of the supporting container.

16. A container as defined in claim 15 wherein each of said corner supports comprises a horizontal member generally triangular in shape and having an inset generally vertical right-angle wall adapted to fit a bottom corner of said side walls, end walls and said bottom.

17. The container of claim 15 wherein said side walls, end walls, and divider walls slope to enable compact nesting of like containers within each other before said corner supports are installed.

18. A container comprising:
side walls, end walls, and a bottom formed integrally,
a facia rim continuous with and integrally formed to said side walls and end walls at the top thereof,
a plurality of corner supports, and
mounting means for removably affixing said corner supports to said facia rim,
each of said corner supports comprising an angle section adapted to fit a bottom corner of said side walls, end walls, and said bottom,
said mounting means including three projections extending from said corner support and three openings defined in said facia rim, one at the corner, one atop a side wall near the corner, and one atop an end wall near the corner, each said opening being adapted to receive a said projection.

19. A container as defined in claim 18 wherein
each said opening is of the same general configuration as the cross-section of its said projection and said projection is tapered to a dimension substantially equal to but greater than said opening, whereby said projection may be fitted into said opening by an interference fit that locks it therein.

20. A container comprising:
side wall, end walls, and a bottom integrally formed together, said side and end walls being substantially equal to height,
a thickened facia rim continuous with an integrally formed to said side walls and end walls at the top thereof,
a plurality of corner supports each of said corner supports comprising an angle section adapted to fit a bottom corner of said side walls, end walls and said bottom,
mounting means for affixing said corner supports to said facia rim, said mounting means comprising a projection extending from said corner support and an opening defined in said facia rim, said opening being adapted to receive said projection, said opening being of the same general configuration as the cross-section of said projection whereby said projection may be fitted into said opening, and
a plurality of divider walls, each having a height substantially less than that of said side and end walls, each divider being integrally formed by said bottom and to one of said side and end walls,
said corner support comprising
a plane section adapted to contact said facia rim proximate a corner thereof;
a projection extending perpendicularly from said plane section and tapered and wherein said opening defined in said facia rim extends downwardly and has a size substantially equal to but less than the maximum size of said projection whereby said corner support may be interference-fitted into said opening; and
an angle section substantially perpendicular to said plane section and adapted to fit the corner formed by the bottom points of said end walls, said side walls and said bottom.

21. A container comprising:
side walls, end walls, and a bottom formed integrally,
a facia rim continuous with and integrally formed to said side walls and end walls at the top thereof, and
a plurality of corner supports;
means for securing said corner supports to said facia rim,
each of said corner supports comprising a horizontal section adapted to contact said facia rim proximate a corner thereof, and an angle section substantially vertical to said horizontal section and adapted to fit the corner formed by the bottom points of said end walls, said side walls and said bottom,
said mounting means comprising a plurality of tapered projections extending perpendicularly from said plane section and a plurality of openings defined in said facia rim, each said opening being adapted to receive a said projection, each said opening defined in said facia rim extending downwardly and having a diameter greater than the minimum diameter and less than the maximum diameter of said projections whereby said corner support may be interference-fitted into said opening.

22. A container as defined in claim 21 wherein there are divider walls at the bottom, some extending parallel to the side walls and some parallel to the ends walls and said side walls, end walls, and divider walls slope to enable nesting of a plurality of said containers, the intersection of said divider walls defining the corners of a pyramidal volume with its apex at the point where the tops of said divider walls intersect and wherein a support structure is provided in said volume, said structure being affixed to said divider walls at said apex and at the diagonally opposed corners.

23. The container of claim 22 wherein each said intersection has a pad thereon lying above the tops of the divider walls and said support structure terminates short of said bottom and, during compact stacking before said corner supports are installed, rests on the pads of the container below.

24. A fresh fruit container that is stackable when filled and compactly stackable when empty comprising:
perforate side walls, end walls, and a bottom wall integrally formed together,
a strengthening facia rim continuous with and integral with said side walls and end walls at the top thereof,
a plurality of corner supports secured to said facia rim when a said container is filled,
each of said corner supports comprising an adapter to engage with the bottom corner of the side walls, end walls and bottom of a container set thereon,
each adapter having mating means on its under side for joining the same to the corner of the facia of the supporting container, and
a plurality of divider walls shorter than said side and end walls, some extending between opposite said side walls and some extending between opposite end walls, said side walls, end walls, and divider walls all sloping outwardly from their lower ends, each divider being integrally formed to said bottom and to either said side walls or said end walls,
said divider walls intersecting to provide compartments suitable for holding berry boxes below the level of said corner supports.

25. A lightweight compartmentized container that stacks compactly with like containers when empty, comprising:
side walls, end walls, and a bottom formed integrally from molded plastic and providing perforations exceeding in area the area of the plastic,
a rim portion continuous with and integrally formed to the side walls and end walls at the top thereof and having near its corners and spaced out therefrom, ribs depending on the outer surface thereof for engagement with the rim of a lower container when the containers are compactly stacked,
a plurality of divider walls shallower than said side walls and end walls extending up from said bottom, some extending between the opposite side walls and some extending between the opposite end walls, to intersect and provide a plurality of compartments, all of said side, end, and divider walls sloping outwardly from their lower to their upper end at about the same angle, the slope being sufficient to enable compact stacking,
each said divider wall comprising two sloping faces joined at their upper ends and separated at the bottom, each intersection of said divider walls defining corners of a pyramidal volume with its apex at the upper end where the upper ends of the divider walls intersect, each said intersection having a pad extending somewhat above the remainder of the divider walls, and reinforcing means at each intersection comprising two intersecting planes integral with said divider walls extending across the diagonally opposed corners of said divider walls from the top to a distance equal approximately to the length of said ribs, whereby when said containers are compactly stacked, each upper container rests on a lower container only where the ribs on an upper container rest on the rim of a lower container and where the reinforcing means rest on a pad.

26. The container of claim 1 wherein a vertically extending external rib is provided on the rim near each corner adapted to engage the rim or a like rib on each adjacent container when loaded for conveying in a vehicle; whereby an adjacent rim is prevented from climbing up on an adjacent rim.

27. The container of claim 26 wherein said divider walls intersect each other and each intersection includes a pad projecting somewhat above the upper ends of said divider walls and an integral reinforcement structure comprising two intersecting diagonal planar members on the lower surface of said divider walls and resting on the pad of a lower like container when the containers are nested.

References Cited

UNITED STATES PATENTS

| | | | |
|---|---|---|---|
| 3,056,232 | 10/1962 | Chaplin | 220—97 |
| 3,191,796 | 6/1965 | Schwartz | 220—23.6 |
| 3,286,877 | 11/1966 | Haimes | 220—83 |
| 3,386,608 | 6/1968 | Diller | 220—23.6 |

OTHER REFERENCES

| | | |
|---|---|---|
| 1,030,457 | 5/1966 | Great Britain. |
| 1,035,182 | 7/1966 | Great Britain. |
| 1,363,229 | 5/1964 | France. |
| 588,869 | 2/1959 | Italy. |

GEORGE E. LOWRANCE, Primary Examiner

U.S. Cl. X.R.

220—21, 83; 229—2.5

PO-1050
(5/69)

UNITED STATES PATENT OFFICE
CERTIFICATE OF CORRECTION

Patent No. 3,480,178      Dated November 25, 1969

Inventor(s)      Henry Z. Morgan

It is certified that error appears in the above-identified patent and that said Letters Patent are hereby corrected as shown below:

Column 2, line 13, "diveded" should read --divided--; line 16, "structure" should read --structural--; Column 7, line 33, "an" should read --and--; line 59, before "walls," second occurrence, at end of line, insert --side--; Column 9, line 32, "equal to" should read --equal in--; Column 10, line 15, "ends walls" should read --end walls--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents